US012811707B2

(12) United States Patent
Pan et al.

(10) Patent No.: US 12,811,707 B2
(45) Date of Patent: Nov. 24, 2026

(54) DATA PROCESSING METHOD AND RELATED APPARATUSES

(71) Applicant: Huawei Technologies Co., Ltd., Shenzhen (CN)

(72) Inventors: Chunpo Pan, Ottawa (CA); Meng Qiu, Kanata (CA); Hossein Najafi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 170 days.

(21) Appl. No.: 18/646,441

(22) Filed: Apr. 25, 2024

(65) Prior Publication Data

US 2025/0337513 A1 Oct. 30, 2025

(51) Int. Cl.
*H04B 10/516* (2013.01)
*H04J 14/02* (2006.01)

(52) U.S. Cl.
CPC ........ *H04J 14/021* (2013.01); *H04J 14/0208* (2013.01)

(58) Field of Classification Search
CPC .................................................... H04B 10/516
See application file for complete search history.

(56) References Cited

U.S. PATENT DOCUMENTS

2022/0247496 A1* 8/2022 Peng .................... H04B 10/616
2025/0358039 A1* 11/2025 Liu ....................... H04L 1/0007

OTHER PUBLICATIONS

Yoshida et al., "Hierarchical Distribution Matching for Probabilistic Shaped Coded Modulation", Journal of Lightwave Technology, vol. 37, No. 6, Mar. 2019 (Year: 2019).*
Xu et al., "Probabilistic Shaping QC-LDPC Coded modulation Scheme for Optical Fiber Systems", CLED Pacific Rim 2018, OSA, 2018 (Year: 2018).*
C. Pan and F. R. Kschischang, "Probabilistic 16-QAM Shaping in WDM Systems," Journal of Lightwave Technology, pp. 4285-4292, 2016.
F. Kschischang and S. Pasupathy, "Optimal Nonuniform Signaling for Gaussian Channels," IEEE Transactions on Information Theory, pp. 913-929, 1993.
K. Wu et al., "List-encoding Ccdm: A Nonlinearity-tolerant Shaper Aided by Energy Dispersion Index," Journal of Lightwave Technology, vol. 40, No. 4, pp. 1064-1071, 2022.
(Continued)

*Primary Examiner* — Shi K Li
(74) *Attorney, Agent, or Firm* — Slater Matsil, LLP

(57) ABSTRACT

The present disclosure provides a method and related products. The method includes: performing distribution matching on a first bit sequence to obtain a second bit sequence; obtaining at least two candidate bit sequences for the second bit sequence, where each of the at least two candidate bit sequences includes a first bit part for identifying the candidate bit sequence and a second bit part obtained based on interleaving of the second bit sequence; determining a third bit sequence in the at least two candidate bit sequences for channel coding. In this way, distribution matching needs to be performed simply once for the first bit sequence while obtaining at least two candidate bit sequences for the second bit sequence, which can reduce redundant processing and improve overall system efficiency.

20 Claims, 6 Drawing Sheets

(56) References Cited

OTHER PUBLICATIONS

M. T. Askari and L. Lampe, “Probabilistic Amplitude Shaping and Nonlinearity Tolerance: Analysis and Sequence Selection Method,” arXiv:2208.03449v4, Apr. 17, 2023, 16 pages.
P. Schulte and G. Böcherer, “Constant Composition Distribution Matching,” IEEE Transactions on Information Theory, vol. 62, No. 1, pp. 430-434, 2016.
Civelli et al., “Practical Implementation of Sequence Selection for Nonlinear Probabilistic Shaping,” https://arxiv.org/abs/2210.12691v1, Oct. 23, 2022, 3 pages.
Civelli et al., “Sequence-Selection-Based Constellation Shaping for Nonlinear Channels,” arXiv:2307.13292v2, Sep. 23, 2023, 13 pages.
Khairi et al., “A 1.41-pJ/b 224-GB/s PAM4 6-bit ADC-Based SerDes Receiver With Hybrid AFE Capable of Supporting Long Reach Channels,” IEEE Journal of Solid-State Circuits, vol. 58 Issue: 1, Jan. 8-18, 2023, 11 pages.
Louwsma et al., “A Time-Interleaved Track & Hold in 0.13µm CMOS Sub-Sampling a 4 Ghz Signal With 43db SNDR,” 2007 IEEE Custom Integrated Circuits Conference, Sep. 16-19, 2007, 4 pages.
Ramirez-Angulo et al., “New Improved CMOS Class AB Buffers Based on Differential Flipped Voltage Followers,” 2006 IEEE International Symposium on Circuits and Systems, May 21-24, 2006, 4 pages.
Razavi, “The StrongARM Latch [A Circuit for All Seasons],” IEEE Solid-State Circuits Magazine, vol. 7, No. 2, Jun. 22, 2015, 6 pages.
Shifman et al., “A 1.64mW Differential Super Source-Follower Buffer With 9.7GHz BW and 43dB PSRR for Time-Interleaved ADC Applications in 10nm,” IEEE Asian Solid-State Circuits Conference, Nov. 4-6, 2019, 4 pages.

* cited by examiner

DATA PROCESSING METHOD AND RELATED APPARATUSES

TECHNICAL FIELD

The present disclosure relates to the field of communication technologies, and in particular, to a data processing method and apparatus, a device, a system and a storage medium.

BACKGROUND

Probabilistic constellation shaping (PCS) is an effective and low-complexity method to enhance optical system performance while accommodating different transmission rates. In an Additive White Gaussian Noise (AWGN) channel, the optimal distribution typically adheres to a Maxwell-Boltzmann (MB) distribution. The ideal MB distribution assumes the transmitted symbols can be treated as i.i.d. random variables, which is impossible to implement in real life.

This background information is provided to reveal information believed by the applicant to be of possible relevance to the present disclosure. No admission is necessarily intended, nor should be construed, that any of the preceding information constitutes prior art against the present disclosure.

SUMMARY

In a first aspect, an embodiment of the present disclosure provides a data processing method, including:

- performing distribution matching on a first bit sequence to obtain a second bit sequence;
- obtaining at least two candidate bit sequences for the second bit sequence, where each of the at least two candidate bit sequences includes a first bit part for identifying the candidate bit sequence and a second bit part obtained based on interleaving of the second bit sequence; determining a third bit sequence in the at least two candidate bit sequences for channel coding.

In a second aspect, an embodiment of the present disclosure provides a data processing method, including:

- obtaining a third bit sequence, where the third bit sequence is determined based on at least two candidate bit sequences for a second bit sequence, and each of the at least two candidate bit sequences includes a first bit part for identifying the candidate bit sequence and a second bit part obtained based on interleaving of the second bit sequence, where the second bit sequence is obtained based on distribution matching of a first bit sequence;
- obtaining the first bit sequence based on the third bit sequence.

In a third aspect, an embodiment of the present disclosure provides a first apparatus including at least one processor coupled to a memory storing a set of instructions; where the at least one processor is configured to execute the set of instructions to cause the apparatus to: perform distribution matching on a first bit sequence to obtain a second bit sequence; obtain at least two candidate bit sequences for the second bit sequence, where each of the at least two candidate bit sequences includes a first bit part for identifying the candidate bit sequence and a second bit part obtained based on interleaving of the second bit sequence; determine a third bit sequence in the at least two candidate bit sequences for channel coding.

In a fourth aspect, an embodiment of the present disclosure provides a second apparatus including at least one processor coupled to a memory storing a set of instructions; where the at least one processor is configured to execute the set of instructions to cause the apparatus to: obtain a third bit sequence, where the third bit sequence is determined based on at least two candidate bit sequence for a second bit sequence, and each of the at least two candidate bit sequences includes a first bit part for identifying the candidate bit sequence and a second bit part obtained based on interleaving of the second bit sequence, where the second bit sequence is obtained based on distribution matching of a first bit sequence.

In a fifth aspect, an embodiment of the present disclosure provides a non-transitory computer-readable medium storing computer execution instructions which, when executed by a processor, causes the processor to execute the method according to the first aspect or any possible implementation of the first aspect, or the second aspect or any possible implementation of the second aspect.

BRIEF DESCRIPTION OF THE DRAWINGS

Reference will now be made, by way of example, to the accompanying drawings which show example embodiments of the present disclosure.

DETAILED DESCRIPTION OF ILLUSTRATIVE EMBODIMENTS

Figure 1:
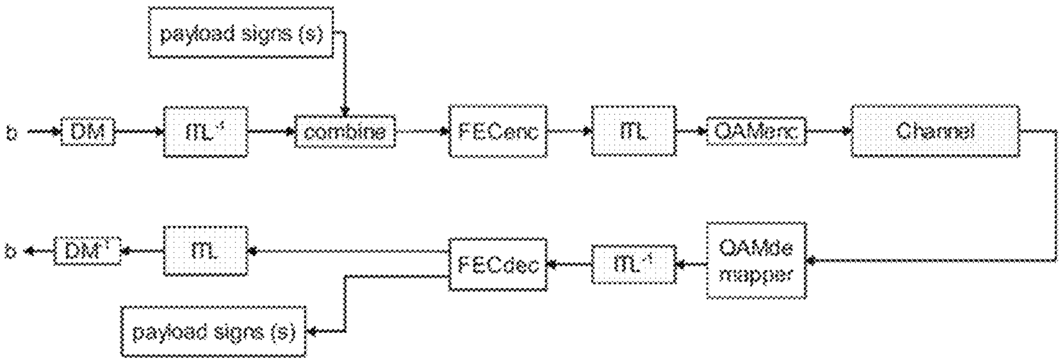
FIG. 1 shows an example block diagram of a PCS system.

In the following description, reference is made to the accompanying figures, which form part of the present disclosure, and which show, by way of illustration, specific aspects of embodiments of the present disclosure or specific aspects in which embodiments of the present disclosure may be used. It is understood that embodiments of the present disclosure may be used in other aspects and include structural or logical changes not depicted in the figures. The following detailed description, therefore, is not to be taken in a limiting sense, and the scope of the present disclosure is defined by the appended claims.

The technical solution proposed by the present disclosure may be applied in an optical communication system. In an optical communication system, light is used as a carrier for transmitting information. The main components of optical networking may include fiber optic cable(s), optical transmitter(s), optical amplifier(s), optical receiver(s), transceivers, wavelength division multiplexing (WDM), optical switches and routers, optical cross-connects (OXCs), and optical add-drop multiplexers (OADMs). Fiber optic cables are a type of high-capacity transmission medium with glass or plastic strands known as optical fibers. The optical fiber may carry light signals over long distances with minimal signal loss and high data transfer rates. A cladding material surrounds the core of each optical fiber, reflecting the light signals back into the core for efficient transmission. The optical transmitter may convert electrical signals into optical signals for transmission over fiber optic cables. Its primary function is to modulate a light source, usually a laser diode or light-emitting diode (LED), in response to electrical signals representing data. The optical amplifier may be strategically placed along the optical fiber network, the optical amplifier may boost the optical signals to maintain signal strength over extended distances. This component compensates for signal attenuation and allows the distance signals to travel without expensive and complex optical-to-electrical signal conversion. A primary type of the optical amplifiers may include: an Erbium-doped fiber amplifier (EDFA), a semiconductor optical amplifier (SOA), or a Raman amplifier. The transceiver may be multifunctional devices that combine the functionalities of both optical transmitters and receivers into a single unit, facilitating bidirectional communication over optical fiber links. They turn electrical signals into optical signals for transmission, and convert received optical signals back into electrical signals. Wavelength division multiplexing (WDM) may allow the simultaneous transmission of multiple data streams over a single optical fiber. The fundamental principle of WDM is to use different wavelengths of light to carry independent data signals, supporting increased data capacity and effective utilization of the optical spectrum. The optical add-drop multiplex (OADM) may be major components in the WDM optical network, offering the capability to selectively add (inject) or drop (extract) specific wavelengths of light signals at network nodes. The OADM may help refine the data flow within the network. Optical switches may selectively route optical signals from input ports to output ports without converting them into electrical signals, while optical routers may direct data packets at the network layer based on their destination addresses, maintaining the integrity of optical signals.

One or more steps of the embodiment methods provided herein may be performed by corresponding units or modules. The units or modules may be in a device, such as in an optical transmitter or in an optical receiver. For example, a signal may be transmitted by a transmitting unit or a transmitting module or a transmitting node. A signal may be received by a receiving unit or a receiving module or a receiving node. A signal may be processed by a processing unit or a processing module. Other steps may be performed by an artificial intelligence (AI) or machine learning (ML) module, which can be chosen or removed according to actual requirements. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation. It should be noted that, the above modules are only illustrative rather than restrictive, and should not be construed as limitations to the embodiments of the present disclosure, more or less modules may be included in the device, which is not limited here. For example, the transmitting module and the receiving module may be replaced with one transceiving module. For another example, the ML module can be included or excluded from the device, depending on actual needs.

Before elaborating the solution of the present disclosure, several terms will be explained in the first place.

Additive White Gaussian Noise (AWGN): A channel is said to be an AWGN channel if the output Y[k], the input X[k], and the noise N[k] can be written as Y[k]=X[k]+N[k], and N[k] satisfies 1) $N[k]\sim\mathcal{N}(\mu,\sigma^2)$ for some $\mu$ and $\sigma$ for all k.
2) N[i] and N[j] and independent and identically distributed (i.i.d.) random variables.

Quadrature amplitude modulation (QAM): quadrature amplitude modulation is a modulation format, in which the modulating signal can take on discrete values, and can be decomposed into an in-phase (real) component and a quadrature (imaginary) component. As a result, the modulating signal can be written as complex numbers. 16-QAM and 64-QAM are QAMs with 16 and 64 possible discrete modulating signals, respectively.

Constellation points: a constellation is the set of complex numbers that can be transmitted over the optical channel. A constellation point is one such complex number for the constellation.

Probabilistic constellation shaping (PCS): when probabilistic constellation shaping is applied on a fixed constellation, the constellation points are transmitted with different probability.

Fiber nonlinearity: Fiber nonlinearity is a property of the optical fiber that causes signal distortion, and the intensity of distortion varies with both the average signal power and the variation of the power. Nonlinear distortion may be caused by the signal in the channel (intra-channel nonlinear interference) of interest or from adjacent channels (inter-channel nonlinear interference).

Figure 2:
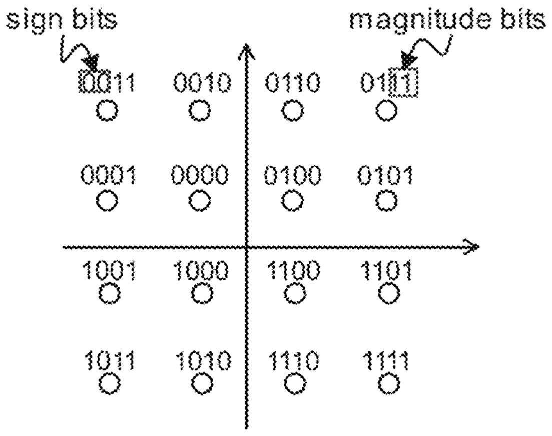
FIG. 2 shows an example constellation labeling design.

PCS is an effective low complexity way to improve an optical system performance and adapt to different transmission rate. For an Additive White Gaussian Noise (AWGN) channel, the optimal distribution follows a Maxwell-Boltzmann (MB) distribution, in which the constellation points with higher magnitude get transmitted with lower probabilities. The ideal MB distribution assumes the transmitted symbols can be treated as independent identically distributed (i.i.d.) random variables, which is impossible to implement in real life. More realistic distribution matchers (DMs) are introduced, and the most popular one is constant-composition-distribution-matching (CCDM). The input and output of CCDM are a finite-length sequence of bits and a finite-length sequence of bits/symbols, respectively. FIG. 1 shows an example block diagram of a PCS system, in which how PCS interacts with forward-error-correction (FEC) is illustrated. FIG. 2 shows an example constellation labeling design. As shown in FIG. 2, the labeling of a QAM constellation can be designed such that some of the bits (sign bits) indicate the signs of the complex symbol, while the others (magnitude bits) indicate the magnitude. Since the PCS distribution is only a function of the magnitudes, not a function of the signs, the shaped bits consist of magnitude bits only. The sign bits are usually equally likely to be 0 or 1, and consist of unshaped payload sign bits and FEC parity bits.

In the case of a bit sequence output, the output length is greater than the input length, and the ratio between the two is called the shaping rate. At the output of a CCDM, given a shaping rate and an output sequence length, the number of 1's in the sequence is fixed regardless to the input. When the output bit sequence length approaches infinity, the performance of the CCDM approaches the performance of MB distribution.

In a fiber-optic channel, MB distributions result in higher peak-to-average power ratios (PAPR), and causes stronger nonlinear distortion compared to uniform input distributions. Such nonlinear distortions can only be partially compensated at the receiver, therefore to maximize the system performance, it is desired to alter the transmitted symbol sequences for reduced nonlinear distortion. One such method is called "sequence selection", in which several symbol sequences are generated to represent the client message. The transmitter calculates some metric to estimate how much nonlinear distortion each symbol sequence is going to cause, and selects the least one to transmit over the channel.

One way to implement the sequence selection architecture is to use a bit scrambling approach. The original information bits (e.g. a sequence 'b') may be scrambled in different ways to generate different candidate bit sequences, each of the generated candidate bit sequences carries bits for identifying the sequence, then the generated candidate bit sequences may undergo DM processing and FEC encoding. Although the identification bits in this approach can be protected, but the complexity is high, as the DM and FEC encoder are called multiple times to generate the candidate bit sequences, and the shaping sequence length needs to be compatible with the FEC block length.

In view of the above, the present disclosure provides a data processing method, in which distribution matching is performed on a first bit sequence to obtain a second bit sequence, at least two candidate bit sequences for the second bit sequence is obtained, where each of the at least two candidate bit sequences includes a first bit part for identifying the candidate bit sequence and a second bit part obtained based on interleaving of the second bit sequence, and a third bit sequence is determined in the at least two candidate bit sequences for channel coding. According to the present disclosure, distribution matching is performed on the first bit sequence to obtain the second bit sequence, and the at least two candidate bit sequences can then be obtained based on bit-level interleaving of the second bit sequence, as the bit-level interleaving will not change the portions of '0' and '1' in the second bit sequence and can thus be performed after the distribution matching, in this way, distribution matching can be performed simply once for the first bit sequence, which can reduce redundant processing and improve overall system efficiency. In addition, since channel coding is done on the determined third bit sequence for channel coding which includes a first bit part for identifying the third bit sequence and a second bit part obtained based on interleaving of the second bit sequence, the first bit part for identifying the candidate bit sequence can be protected with an error detection and correction technology, such as forward error correction (FEC). In this way, error resilience of the system can be improved.

The method of the present disclosure can be applied in many scenarios, for example, in a fiber-optic communication system with PCS and with the need to manage fiber nonlinearity. PCS may be adopted for 800 OpenROADM, and considered for 800 ZR+ standards. Nonlinearity management may be considered for the next generation OpenROADM, ZR, and ZR+ standards.

The method of the present disclosure may be applicable to other communication systems (other than fiber-optic communications), when the channel response is dependent on the signal distribution, and selecting a channel friendly sequence may benefit the system.

Figure 3:
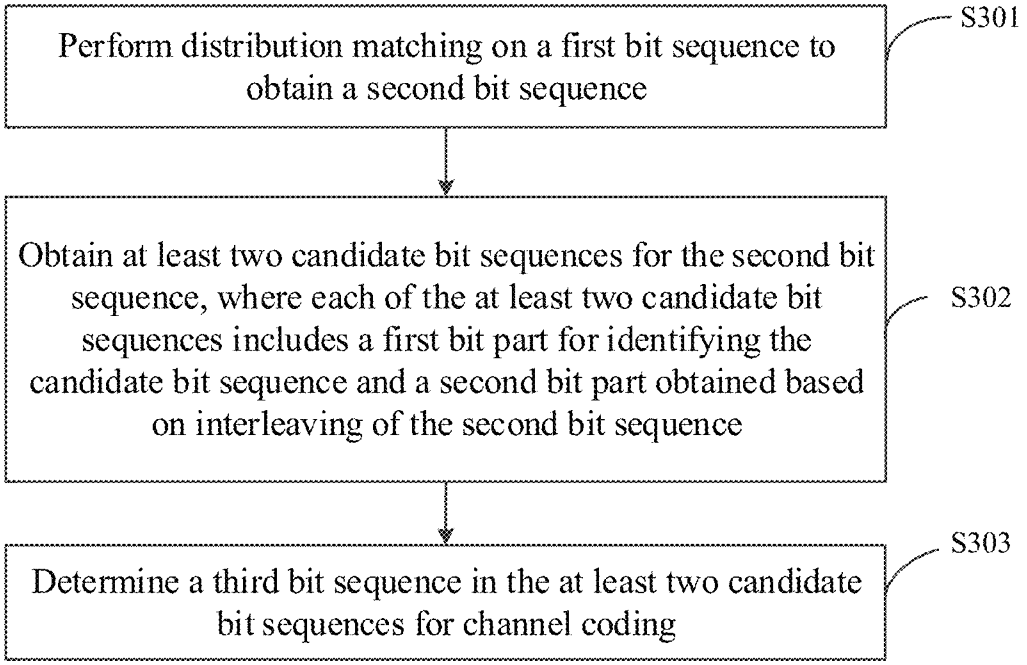
FIG. 3 shows a schematic flowchart of a data processing method according to one or more example embodiments of the present disclosure.

FIG. 3 shows a schematic flowchart of a data processing method according to one or more example embodiments of the present disclosure. The method may be implemented by an apparatus, such as a data processing apparatus, or other devices, such as a chip which has similar function. Optionally, the apparatus may be integrated into an encoder for encoding code bits to be transmitted by a transmitting node, such as a network device, a user equipment, an electronic device, which is not limited herein. As shown in FIG. 3, the method can include the following steps.

S301 Perform Distribution Matching on a First Bit Sequence to Obtain a Second Bit Sequence.

In the embodiment, the transmitting node may perform distribution matching on a first bit sequence and obtain a second bit sequence. Both of the first bit sequence and the second bit sequence may include magnitude bits and sign bits. For example, the transmitting node may perform distribution matching by using one or more DMs, and the number of the at least one DM may be determined according to a length of the first bit sequence (input bit sequence) or according to actual needs, which is not limited here. In the case where multiple DMs are used for conducting the distribution matching of the first bit sequence, the second bit sequence would be a combination of output bit sequences of the multiple DMs.

In a possible implementation, the first bit sequence may be a sequence to be shaped. For example, the first bit sequence may be an original bit sequence for a user, or it can be a bit sequence obtained based on processing of the original bit sequence, which is not limited in the embodiments of the present disclosure. In the following, the first bit sequence being the original bit sequence may be taken as an example for description, but the solution also applies for processed bit sequence.

In a possible implementation, the first bit sequence may include magnitude bits and sign bits corresponding to the magnitude bits, where the distribution matching is performed on the magnitude bits of the first bit sequence. The magnitude bits may represent the amplitude or size or value of the signal, and the sign bits may represent the phase or direction of the signal (often denoted as 0 or 1). The transmitting node may perform distribution matching on the magnitude bits of the first bit sequence while keeping the sign bits unchanged. The magnitude bits of the first bit sequence may be adjusted to be more suitable for transmission. By performing distribution matching on the magnitude bits, the power efficiency, and the noise tolerance can be improved, the efficiency of subsequent processing steps, such as channel coding, can be improved.

In a possible implementation, multiple DM output sequences may be grouped together to form one bit sequence as the second bit sequence for subsequent processing. For example, an M-ary modulation format may be used, the DM output is a binary sequence of length $n_{DM}$, where M is a positive integer. l (l≥1) DM output sequences are grouped together to form one input sequence (as the second bit sequence) of length $l \cdot n_{DM}$ for subsequent processing (such as, interleaving).

S302, Obtain at Least Two Candidate Bit Sequences for the Second Bit Sequence, where Each of the at Least Two Candidate Bit Sequences Includes a First Bit Part for Identifying the Candidate Bit Sequence and a Second Bit Part Obtained Based on Interleaving of the Second Bit Sequence.

In the embodiment, the transmitting node may obtain at least two candidate bit sequences for the second bit sequence. Each of the at least two candidate bit sequences may include a first bit part for identifying the candidate bit sequence and a second bit part obtained based on interleaving of the second bit sequence. By applying different bit-level interleaving patterns or rules on the second bit sequence, multiple candidate bit sequences can be generated. As one possible implementation, the second bit sequence includes magnitude bits of the first bit sequence after the distribution matching, as another possible implementation, the second bit sequence includes magnitude bits of the first bit sequence after the distribution matching and the sign bits of the first bit sequence. In both implementations, each candidate bit sequence obtained based on the second bit sequence may have the same bits but rearranged differently, thus providing a variety of options for transmission. For each of the at least two candidate bit sequences, the portions of 0's and 1's in the bit sequence before the bit-level interleaving and the bit sequence after the bit-level interleaving remain the same.

As one possible implementation, the second bit part of each candidate bit sequence is generated based on applying a specific bit-level interleaving pattern or rule to the second bit sequence, as another possible implementation, for one of the candidate bit sequences, its second bit part may be the second bit sequence, and for other candidate bit sequences, their second bit parts may be generated based on different bit-level interleaving patterns or rules. For the case where the second bit sequence is directly used as the second bit part of the candidate bit sequence, the bit-level interleaving pattern or rule can be regarded as maintaining the input and output of the interleaving of the second bit sequence to be the same.

In a possible implementation, the first bit part for identifying the candidate bit sequence may be called a pilot/indication bit (or pilots/indication bits) which is used to indicate/identify which bit-level interleaving pattern/rule has been used for obtaining the candidate bit sequence, so that if this candidate bit sequence is selected for transmission, the receiving end would identify the candidate bit sequence based on its first bit part. For a candidate bit sequence, the second bit part may be obtained based on interleaving of the second bit sequence, and the first bit part may be added to identify the candidate bit sequence so that the receiving node can perform bit-level de-interleaving correctly. As one possible implementation, the first bit part for each candidate bit sequence may be added on fixed positions, in this way, the receiving node can quickly locate the first bit part, and in other implementations, the first bit parts for different candidate bit sequences may be put on different positions, as long as the receiving node knows the position arrangement of the first bit part. Here it should be noted that the number of the pilot/indication bits could be one or more, which can be determined based on actual needs and is not limited in the embodiments of the present disclosure.

It should be noted that the interleaving of the second bit sequence is a bit-level interleaving, which is carried out before the constellation mapping and the sequence selection and is different from the channel interleaving operation.

S303, Determine a Third Bit Sequence in the at Least Two Candidate Bit Sequences for Channel Coding.

In the embodiment, after obtaining the at least two candidate bit sequences, the transmitting node may determine a third bit sequence in the at least two candidate bit sequences for channel coding. The candidate bit sequences may be evaluated by using a selection metric, such as potential for non-linear distortion or a signal-to-noise ratio. For example, the candidate bit sequence that performs best according to the metric may be selected for channel coding and subsequent transmission. Here the channel coding may be some error protection mechanisms, e.g., FEC, or it may also include channel interleaving plus FEC, which is not limited in the embodiments of the present disclosure.

According to the method provided by the embodiments of the present disclosure, a second bit sequence is obtained by performing distribution matching on a first bit sequence, at least two candidate bit sequences are obtained based on interleaving of the second bit sequence, then a third bit sequence in at least two candidate bit sequences is determined for channel coding, each of the at least two candidate bit sequences for the second bit sequence includes a first bit part for identifying the candidate bit sequence and a second bit part obtained based on interleaving of the second bit sequence.

As stated in the related art, one way is to use scrambling to get candidate bit sequences for sequence selection. However, as PCS aims to apply a non-uniform probability distribution to a fixed constellation, but the scrambling would generally make the possibilities of '0' and '1' be the same on the output due to the fact that the scrambling is typically used to randomize bit patterns to prevent long sequences of the same bit which could reduce the efficiency of channel coding, so if we choose the scrambling for generating the candidate bit sequences, the scrambling should be performed before the DM, otherwise the scrambling would affect the non-uniform probability distribution of the DM's output, that is, if the scrambling was performed after the DM, the carefully crafted distribution at the DM that is not of equal probability could be disrupted by the scrambling process, thus reducing the effectiveness of the PCS technology. However, as described before, if scrambling is performed before the DM, the DM and FEC encoder may be called multiple times, thus increasing the complexity of sequence selection processing.

According to the method provided by the embodiments of the present disclosure, bit-level interleaving is used to generate multiple candidate sequences. Since bit-level interleaving does not change the probability distribution, it allows the DM's output to maintain its non-uniform distribution, which may be important for achieving the desired performance improvements. That is, as the bit-level interleaving will not change the portions of '0' and '1' in the second bit sequence and can thus be performed after the distribution matching, when the bit-level interleaving is performed after the distribution matching operation, the DM can be called simply once while generating multiple candidate sequences, which can reduce redundant processing and improve overall system efficiency. In addition, since channel coding is done on the determined third bit sequence for channel coding which includes a first bit part for identifying the third bit sequence and a second bit part obtained based on interleaving of the second bit sequence, the first bit part for identifying the third bit sequence can be protected with an error detection and correction technology, such as FEC. In this way, error resilience of the system can be improved.

In a possible implementation, the second bit sequence may include magnitude bits of the first bit sequence after the distribution matching, so the bit-level interleaving for obtaining the candidate bit sequences based on the second bit sequence is done on magnitude bits of the first bit sequence after the distribution matching. The second bit sequence may include the modified magnitude bits from the first bit sequence, which is shaped according to the desired distribution (e.g., a Maxwell-Boltzmann distribution for an AWGN channel). This process can improve the power efficiency, and the noise tolerance of the data transmission.

In a possible implementation, for each of the at least two candidate bit sequences, the transmitting node may perform constellation mapping on the candidate bit sequence to obtain a first symbol sequence, and may determine a bit sequence corresponding to a first symbol sequence in at least two first symbol sequences to be the third bit sequence. Constellation mapping is a process where bits are converted into symbols based on a predefined constellation diagram. In a possible implementation, the constellation diagram may be a QAM (Quadrature Amplitude Modulation) constellation. The output of the constellation mapping for each candidate bit sequence is a symbol sequence. The symbol sequence may represent the modulated signal that can be transmitted over the communication channel. Each symbol in the sequence may be a complex value that carries information about the original bit sequence. By performing constellation mapping on the candidate bit sequence and selecting the optimal bit sequence based on the resulting first symbol sequences, the selection of the most appropriate symbol sequence can be allowed, and the impact of non-linear effects in the communication channel can be reduced.

In a possible implementation, the transmitting node may perform the channel coding on a combination of the third bit sequence and the sign bits of the first bit sequence to obtain first parity bits for the third bit sequence, and may transmit/output a first to-be-transmitted bit sequence, where the first to-be-transmitted bit sequence may include the third bit sequence, the sign bits of the first bit sequence and the first parity bits for the third bit sequence. The sign bits of the first bit sequence may be payload sign bits, which may be phase information bits that are part of the original data to be transmitted. The payload sign bits may be used for reconstructing the phase of the transmitted symbols at the receiving end. Besides, the transmission of the first to-be-transmitted bit sequence over the communication channel is to transmit symbols corresponding to the first to-be-transmitted bit sequence, e.g., the symbols can be obtained based on constellation mapping of the first to-be-transmitted bit sequence, and the constellation mapping for the first to-be-transmitted bit sequence uses the same constellation mapping scheme as the constellation mapping scheme applied to the third bit sequence before the sequence selection among different candidate bit sequences. As one possible implementation, after the candidate bit sequences are generated and before the third bit sequence is selected, each of the candidate bit sequences undergoes constellation mapping, so when one of the candidate bit sequences is selected as the third bit sequence, the previous result of the constellation mapping, i.e., the symbols corresponding to the third bit sequence may be directly used for transmission, thus further improving the system efficiency.

The transmitting node may generate first parity bits by performing the channel coding on the combination of the third bit sequence and the sign bits of the first bit sequence. The channel coding process may include at least one of FEC encoding, interleaving, modulation, signal processing, Cyclic Redundancy Check (CRC), encryption, or rate matching. These parity bits may be additional bits that may be used for error detection and correction at the receiver. The transmitting node then may form the first to-be-transmitted bit sequence by combining the third bit sequence, the sign bits of the first bit sequence, and the first parity bits.

By combining the third bit sequence with the sign bits of the first bit sequence for channel coding, the first parity bits can enhance error detection and correction capabilities. In addition, by transmitting the first to-be-transmitted bit sequence including first parity bits derived from the combination of the third bit sequence and the sign bits of the first bit sequence, the parity information can be efficiently utilized to reconstruct the original data, reducing decoding delays and improving decoding efficiency.

In a possible implementation, the transmitting node may perform a first channel interleaving operation on multiple third bit sequences to obtain a first to-be-coded sequence, may code a combination of the first to-be-coded sequence and the sign bits of the first bit sequence by means of a preset channel coding scheme to obtain a first coded sequence, and may perform a second channel interleaving operation on the first coded sequence to obtain the first parity bits, where the second channel interleaving operation is an inverse process of the first channel interleaving operation. The transmitting node may obtain multiple third bit sequences, which may be the selected bit sequences for transmission, and may perform a first channel interleaving operation on them. The first channel interleaving may be performed by rearranging the bits in a sequence to spread out any burst errors that might occur during transmission, making it easier for the receiver to correct these errors. In addition, since the channel coding is done on the selected bit sequences, so the compatibility between each selected bit sequence and the FEC block length is no longer a constraint.

The transmitting node may code the first to-be-coded sequence and the sign bits of the first bit sequence by means of a preset channel coding scheme. The preset channel coding scheme may be a FEC method, such as a Reed-Solomon code, LDPC code, or any other error-correcting code that adds redundancy to the data for error detection and correction. That is to say, the first coded sequence may include both the data and the error-correcting redundancy bits. After channel coding, the transmitting node may perform a second channel interleaving operation on the first coded sequence, which is the inverse of the first channel interleaving operation. In other words, the second channel interleaving operation may reverse the rearrangement done in the first channel interleaving operation, restoring the bits to their original order before the coding process. The second interleaving operation may be to rearrange the bits in the coded sequence again, potentially to optimize the data for transmission or to meet specific requirements of the transmission medium or the receiver's capabilities. In this way, the system can effectively encode the information from the third bit sequence, and can prepare the data for transmission over the communication channel while mitigating the effects of channel impairments.

In a possible implementation, the second bit sequence may include magnitude bits of the first bit sequence after the distribution matching and the sign bits of the first bit sequence. That is to say, the second bit sequence may retain the phase information from the original signal while having an amplitude distribution that is optimized for transmission, so the bit-level interleaving for obtaining the candidate bit sequences based on the second bit sequence is done on both magnitude bits of the first bit sequence after the distribution matching and the sign bits of the first bit sequence. The combination may ensure that the signal is amplitude-optimized for the channel. This approach may be beneficial for improving the performance of the communication system. Besides, as one possible implementation, the receiving node knows the structure of the second bit sequence, that is, where the magnitude bits of the first bit sequence after the distribution matching and the sign bits of the first bit sequence are located, so as to perform inverse distribution matching on the magnitude bits of the first bit sequence.

In a possible implementation, for each of the at least two candidate bit sequences, the transmitting node may perform constellation mapping on a combination of the candidate bit sequence and second parity bits to obtain a second symbol sequence, and may determine a bit sequence corresponding to a second symbol sequence in at least two second symbol sequences to be the third bit sequence. The second parity bits may be obtained from transmission of a bit sequence preceding the first bit sequence. The second parity bits may be additional bits that are generated from the transmission of a preceding bit sequence, which could be part of a previous transmission frame before the current frame carrying the first bit sequence, and the second parity bits may be used for error detection and correction. For each candidate bit sequence, the transmitting node may perform constellation mapping on a combination of the candidate bit sequence and the second parity bits, and obtain a second symbol sequence. The transmitting node may evaluate the second symbol sequences generated from the candidate bit sequences, potentially using a selection metric that considers the channel conditions and the desired transmission performance. The transmitting node may select the bit sequence that corresponds to the best-performing second symbol sequence as the third bit sequence.

By performing constellation mapping on the candidate bit sequence and selecting the optimal bit sequence based on the resulting first symbol sequences, the selection of the most appropriate symbol sequence can be allowed, and the system can represent data more effectively, which can improve decoding accuracy at the receiver end.

In a possible implementation, positions of the second parity bits for combining with each of the at least two candidate bit sequences are predefined. By including the second parity bits in the predefined positions, efficient error detection can be enabled during transmission, a process of data verification can be simplified and error correction can be performed promptly. The second parity bits, which are generated from a previous transmission or a preceding part of the current transmission, may have specific positions allocated within the overall bit sequence structure. In this way, once the receiving end receives the previous frame and the current frame, it can find the parity bits of the current frame at fixed positions of a decoding result of the previous frame. For the second parity bits in the initial transmission, in a possible implementation, the second parity bits in the initial transmission can be preset data which can be used to help the demodulation on the receiving end, or can be random data which is not used for decoding on the receiving end. These positions may be determined in advance and may be known to both the transmitting and receiving nodes.

In a possible implementation, the transmitting node may transmit a second to-be-transmitted bit sequence, where the second to-be-transmitted bit sequence includes the third bit sequence and the second parity bits, where positions of the second parity bits in the second to-be-transmitted bit sequence are predefined. By transmitting a second to-be-transmitted bit sequence including the second parity bits in the predefined positions, efficient error detection for the bit sequence preceding the first bit sequence can be enabled during transmission, and the decoding efficiency for the bit sequence preceding the first bit sequence can be ensured, a process of data verification can be simplified and error correction can be performed promptly. Besides, the transmission of the second to-be-transmitted bit sequence over the communication channel is to transmit symbols corresponding to the second to-be-transmitted bit sequence, e.g., the symbols can be obtained based on constellation mapping of the second to-be-transmitted bit sequence, and the constellation mapping for the second to-be-transmitted bit sequence uses the same constellation mapping scheme as the constellation mapping scheme applied to the third bit sequence before the sequence selection among different candidate bit sequences. As one possible implementation, after the candidate bit sequences are generated and before the third bit sequence is selected, each of the candidate bit sequences undergoes constellation mapping, so when one of the candidate bit sequences is selected as the third bit sequence, the previous result of the constellation mapping, i.e., the symbols corresponding to the third bit sequence may be directly used for transmission, thus further improving the system efficiency.

In a possible implementation of the first aspect, a position of a first bit part of the third bit sequence is predefined. By recognizing the pattern of the first bit part or its position within the received bit sequence, the receiving device can determine the correct bit-level interleaving pattern/rule (e.g., the correct interleaver) to apply during the bit-level deinterleaving process. In other implementations, instead of using fixed positions, the first bit part for the third bit sequence may be determined based on a certain rule, as long as the receiving node knows the position arrangement of the first bit part.

In a possible implementation, the transmitting node may perform the channel coding on the third bit sequence to obtain third parity bits for the third bit sequence, where the third parity bits for the third bit sequence are transmitted with a bit sequence subsequent to the first bit sequence. Since the third parity bits for the third bit sequence can be transmitted with a bit sequence subsequent to the first bit sequence, error detection for the bit sequence subsequent to the first bit sequence can be allowed and the parity bits can help in identifying and correcting errors that occur in the received data, which increases the reliability of the communication system.

In a possible implementation, the transmitting node may perform a third channel interleaving operation on multiple third bit sequences to obtain a second to-be-coded sequence, code the second to-be-coded sequence by means of a preset channel coding scheme to obtain a second coded sequence, and perform a fourth channel interleaving operation on the second coded sequence to obtain the third parity bits. The fourth channel interleaving operation may be an inverse process of the third channel interleaving operation. As one possible implementation, the transmitting node may obtain multiple third bit sequences, which may be the selected sequences for transmission, and may perform a third channel interleaving operation on them. The third channel interleaving may be performed by rearranging the bits in a sequence to spread out any burst errors that might occur during transmission, making it easier for the receiving node to correct these errors.

The transmitting node may code the second to-be-coded sequence by a preset channel coding scheme. The preset channel coding scheme may be a FEC method, such as a Reed-Solomon code, LDPC code, or any other error-correcting code that adds redundancy to the data for error detection and correction. That is to say, the second coded sequence may include both the data and the error-correcting redundancy bits. After channel coding, the transmitting node may perform a fourth channel interleaving operation on the first coded sequence, which is the inverse of the third channel interleaving operation. In other words, the fourth channel interleaving operation may reverse the rearrangement done in the first channel interleaving operation, restoring the bits to their original order before the coding process. The fourth interleaving operation may be to rearrange the bits in the coded sequence again, potentially to optimize the data for transmission or to meet specific requirements of the transmission medium or the receiver's capabilities. The third parity bits for the third bit sequence may be transmitted with a bit sequence subsequent to the first bit sequence. In this way, the system can effectively encode the information from the third bit sequence, and can prepare the data for transmission over the communication channel while mitigating the effects of channel impairments.

In a possible implementation, the transmitting node may transmit a third to-be-transmitted bit sequence, where the third to-be-transmitted bit sequence may include the bit sequence subsequent to the first bit sequence and the third parity bits, where positions of the third parity bits in the third to-be-transmitted bit sequence may be predefined. The technical effects of using fixed positions for the third parity bits are similar to the case where fixed positions are used for the second parity bits, which will not be detailed herein.

Figure 4:
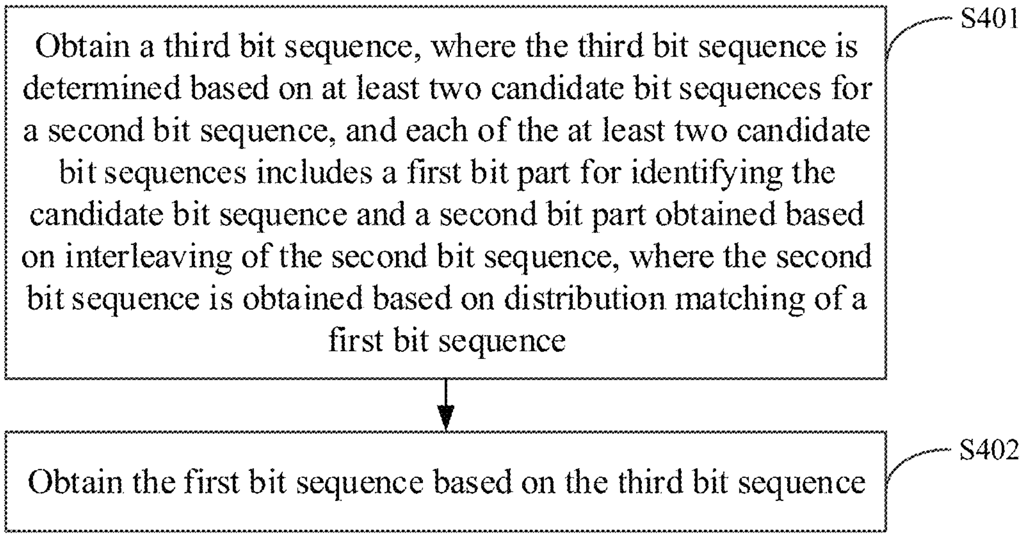
FIG. 4 shows a schematic flowchart of a data processing method according to one or more example embodiments of the present disclosure.

FIG. 4 shows a schematic flowchart of a data processing method according to one or more example embodiments of the present disclosure. The method may be implemented by an apparatus, such as a data processing apparatus, or other devices, such as a chip which has similar function. Optionally, the apparatus may be integrated into a decoder for decoding code bits to be transmitted by a receiving node, such as a terminal device, a user equipment, an electronic device, which is not limited herein. As shown in FIG. 4, the method can include the following steps.

S401, Obtain a Third Bit Sequence, where the Third Bit Sequence is Determined Based on at Least Two Candidate Bit Sequences for a Second Bit Sequence, and Each of the at Least Two Candidate Bit Sequences Includes a First Bit Part for Identifying the Candidate Bit Sequence and a Second Bit Part Obtained Based on Interleaving of the Second Bit Sequence, where the Second Bit Sequence is Obtained Based on Distribution Matching of a First Bit Sequence.

S402, Obtain the First Bit Sequence Based on the Third Bit Sequence.

Specifically, since the third bit sequence comes from interleaving of the second bit sequence which is from distribution matching of the first bit sequence, correspondingly, deinterleaving and inverse distribution matching would be performed for obtaining the first bit sequence.

In the embodiment, the receiving node may obtain a third bit sequence, which is a sequence that has been selected for transmission based on at least two candidate bit sequences. Each candidate bit sequence may include a first bit part that serves as an identifier of this candidate bit sequence. The first bit part may be used to distinguish one candidate bit sequence from another, allowing the receiving node to know which candidate bit sequence has been transmitted. Each candidate bit sequence may further include a second bit part that is obtained based on the interleaving of the second bit sequence. The second bit sequence may be obtained based on the distribution matching of a first bit sequence. The distribution matching may be used to shape the constellation points based on the channel conditions, aiming to increase the system power efficiency and noise tolerance.

In a possible implementation, the receiving node may receive a first to-be-transmitted bit sequence, where the first to-be-transmitted bit sequence may include the third bit sequence, the sign bits of the first bit sequence and the first parity bits for the third bit sequence. The sign bits of the first bit sequence may be payload sign bits, which may contain original phase information bits that are part of the data to be transmitted. The payload sign bits may be used for reconstructing the phase of the transmitted symbols by the receiving node. Here the reception of the first to-be-transmitted bit sequence may be receiving a signal carrying demodulated symbols corresponding to the first to-be-transmitted bit sequence, e.g., carrying modulated symbols corresponding to the first to-be-transmitted bit sequence. Specifically, once receiving the first to-be-transmitted bit sequence, the receiving end performs a constellation de-mapping which corresponds to the constellation mapping performed on the transmitting end (e.g., QAM demodulation) and channel decoding to obtain the third bit sequence and the sign bits of the first bit sequence, then the receiving node may use the first bit part of the third bit sequence (e.g., they may be at fixed positions) to determine the bit-level interleaving pattern/rule adopted for the third bit sequence (the bit-level interleaving scheme performed on the second bit sequence for obtaining the third bit sequence on the transmitting end) and perform a corresponding bit-level de-interleaving on the third bit sequence, then inverse DM is performed on the obtained de-interleaved bit sequence, and with combination of the sign bits of the first bit sequence, the first bit sequence can be obtained correspondingly. It should be noted that the channel decoding may be an inverse process corresponding to the channel coding described on the transmitting end, which will not be repeated here for brevity.

In a possible implementation, the receiving node may receive a second to-be-transmitted bit sequence, where the second to-be-transmitted bit sequence includes the third bit sequence and second parity bits, where the second parity bits are used for channel decoding of a bit sequence preceding the first bit sequence, and positions of the second parity bits in the second to-be-transmitted bit sequence are predefined. The receiving node may receive a third to-be-transmitted bit sequence, where the third to-be-transmitted bit sequence includes the bit sequence subsequent to the first bit sequence and third parity bits, where the third parity bits may be used for channel decoding of the third bit sequence, and positions of the third parity bits in the third to-be-transmitted bit sequence may be predefined. The receiving node may obtain the third bit sequence based on the second to-be-transmitted bit sequence and the third parity bits in the third to-be-transmitted bit sequence. Here the reception of the second and third to-be-transmitted bit sequences may be receiving signals carrying the second and third to-be-transmitted bit sequences, e.g., carrying modulated symbols corresponding to the second and third to-be-transmitted bit sequences. Since the third to-be-transmitted bit sequence includes the third parity bits in the predefined positions which are parity bits for the second to-be-transmitted bit sequence, so the second to-be-transmitted bit sequence can be decoded with one frame delay, upon receiving the next to-be-transmitted bit sequence (the third to-be-transmitted bit sequence).

Based on the signal carrying the second to-be-transmitted bit sequence, the receiving end performs a constellation de-mapping which corresponds to the constellation mapping performed on the transmitting end (e.g., QAM demodulation) to obtain the third bit sequence, and the receiving end can also obtain the third parity bits based on the third to-be-transmitted bit sequence in a similar way. Then the receiving node performs channel decoding of the third bit sequence, that is, the receiving node verifies, based on the third parity bits, the third bit sequence obtained from the second to-be-transmitted bit sequence, when the verification passes, the receiving node checks the first bit part of the third bit sequence to determine the bit-level de-interleaving scheme, and then performs bit-level de-interleaving on the third bit sequence and subsequent inverse DM on the shaped magnitude bits, and then combines the sign bits and the output of the inverse DM to retrieve the original bit sequence that was shaped for transmission. Once the inverse DM is completed, the receiving node can reconstruct the original data.

According to the method provided by the embodiments of the present disclosure, a third bit sequence may be obtained, where the third bit sequence is determined based on at least two candidate bit sequence for a second bit sequence, and each of the at least two candidate bit sequences includes a first bit part for identifying the candidate bit sequence and a second bit part obtained based on interleaving of the second bit sequence, where the second bit sequence is obtained based on distribution matching of a first bit sequence. According to the present disclosure, distribution matching is performed on the first bit sequence to obtain the second bit sequence, and the at least two candidate bit sequences can then be obtained based on bit-level interleaving of the second bit sequence, as the bit-level interleaving will not change the portions of '0' and '1' in the second bit sequence and can thus be performed after the distribution matching, in this way, distribution matching can be performed simply once for the first bit sequence, which can reduce redundant processing and improve overall system efficiency. In addition, since channel coding is done on the determined third bit sequence for channel coding which includes a first bit part for identifying the third bit sequence and a second bit part obtained based on interleaving of the second bit sequence, the first bit part for identifying the third bit sequence can be protected with an error detection and correction technology, such as FEC. In this way, error resilience of the system can be improved.

It should be understood by a person skilled in the art that, the relevant description of the above modules in the possible implementations of the present disclosure may be understood with reference to the relevant description of the interleaving method in the possible implementations of the present disclosure. The technical effect achieved by the above apparatus is similar as that achieved by the above possible method implementations, which is not repeated herein.

Figure 5:
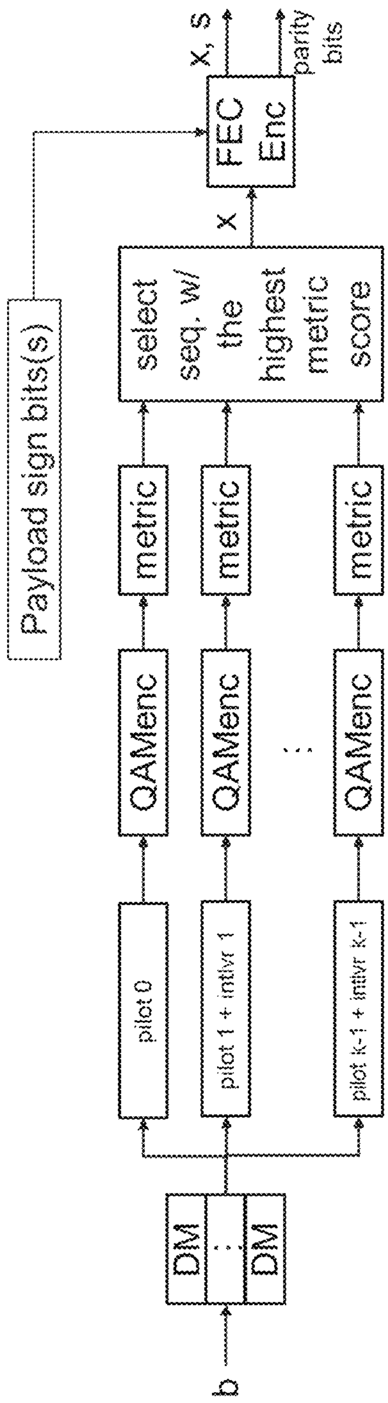
FIG. 5 shows a schematic illustration of a sequence selection method according to one or more example embodiments of the present disclosure.

FIG. 5 is a schematic illustration of a sequence selection method according to one or more example embodiments of the present disclosure.

As shown in FIG. 5, an M-ary modulation format can be used, and a bit sequence (denoted as b, which may be a specific example of the first bit sequence) is input into a DM. The DM output is a binary sequence of length $n_{DM}$. l ($l \geq 1$) DM output sequences may be grouped together to form one input sequence (which may be a specific example of the second bit sequence) of length $l \cdot n_{DM}$ as input of subsequent interleaving operations. Then k different candidate bit sequences which may be generated by interleaving the shaped bits with k distinct interleavers (an interleaver ensures the portions of 0's and 1's remain the same), where k is a positive integer. Pilot/indication bit(s) of length $\log_2 k$ may be inserted after interleaving to indicate which interleaver is used. For example, the pilot bits for each of the candidate bit sequences may be a specific example of the first bit part for identifying the candidate bit sequence as mentioned above. The pilot bits may be used for the receiving node to correctly de-interleave a received sequence and recover the original data. For each candidate bit sequence, these $l \cdot n_{DM} + \log_2 k$ bits may form the magnitude bits of a symbol sequence and are mapped to $n_{sym} = (l \cdot n_{DM} + \log_2 k)/(\log_2 M - 2)$ amplitudes using the QAM encoder.

Selection metric of each candidate bit sequence may be calculated for each of the k amplitude sequences, and the one with the highest score (which may be a specific example of the third bit sequence) is selected to go through FEC encoding. The input to the FEC encoder may include shaped bits x (which may be a specific example of the third bit sequence) and some payload sign bits s (which may be a specific example of the signs bits of the first bit sequence), and the generated parity bits (which may be a specific example of the first parity bits) occupy the remaining sign bit locations. The FEC encoder generates parity bits, which are then interleaved with the shaped bits and transmitted along with the payload sign bits. Here the combination of the shaped bits x, payload sign bits s and parity bits shown in FIG. 5 is a specific example of the first to-be-transmitted bit sequence as described above.

Once receiving the first to-be-transmitted bit sequence, the receiving end performs a constellation de-mapping which corresponds to the constellation mapping performed on the transmitting end (e.g., QAM demodulation) and channel decoding to obtain the shaped bits x and the payload sign bits s, then the receiving node may use the pilot bits to determine the bit-level interleaving pattern/rule adopted for the shaped bits x and perform a corresponding bit-level de-interleaving on the shaped bits x, then inverse DM is performed on the obtained de-interleaved bit sequence, and with combination of the payload sign bits s of the bit sequence b, the bit sequence b can be obtained correspondingly.

In the example, the selection metric is sign-independent, and the DM and FEC encoder may be called simply once while generating multiple candidate bit sequences. Moreover, the pilot bits can be protected by the FEC while the decoding delay and overhead can be reduced.

Figure 6:
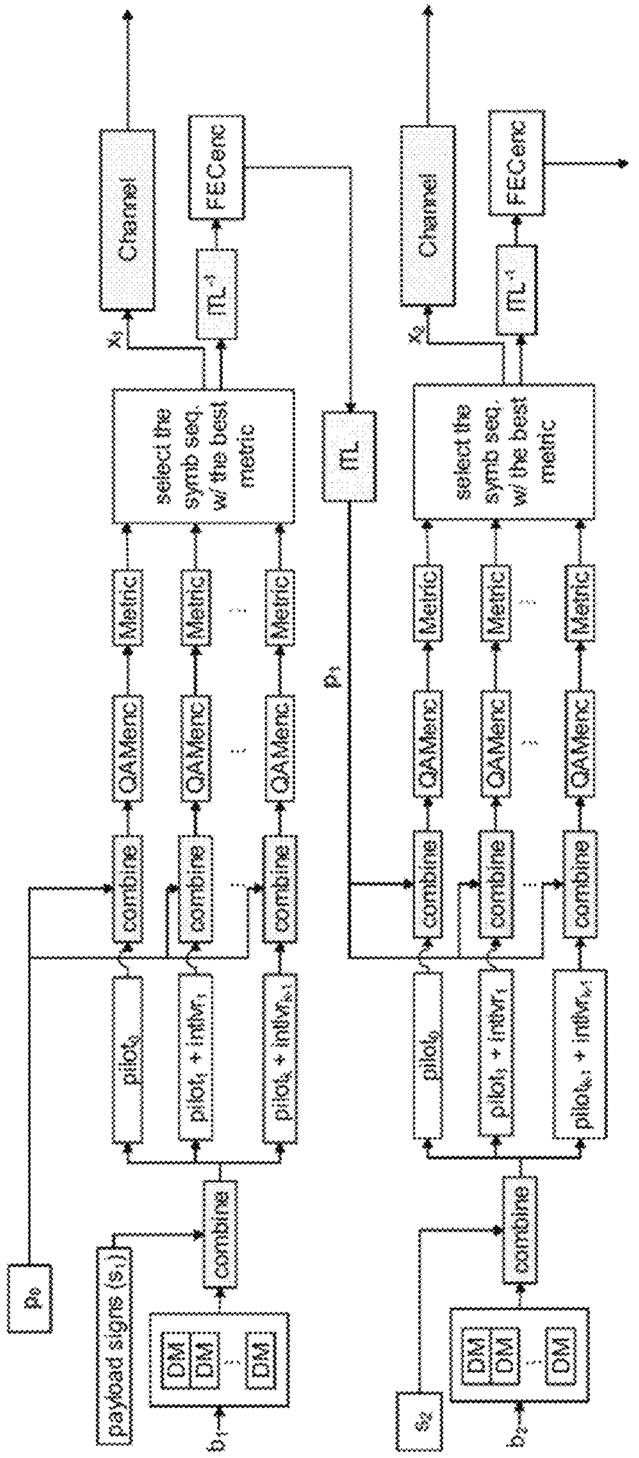
FIG. 6 shows a schematic illustration of a sequence selection method according to one or more example embodiments of the present disclosure.

FIG. 6 is a schematic illustration of a sequence selection method according to one or more example embodiments of the present disclosure.

As shown in FIG. 6, a boot-strapping strategy is used to handle FEC parity bits. An M-ary modulation format is used and a bit sequence (denoted as $b_1$, which is a specific example of the first bit sequence) is input into a DM. The DM output is a binary sequence of length $n_{DM}$. For the i-th FEC frame for transmitting the bit sequence $b_1$, $l \cdot n_{DM}$ shaped bits (which is a specific example of magnitude bits of the first bit sequence after the distribution matching) are combined with $n_s$ payload sign bits (which is a specific example of the sign bits of the first bit sequence) to act as the input to k distinct interleavers, after which $\log_2 k$ pilot bits are inserted, where i is a positive integer, k is a positive integer, $l \geq 1$. For each of k candidate bit sequences, the $(l \cdot n_{DM} + n_s + \log_2 k)$ interleaved bits are combined with $(2n_{sym} - n_s - \log_2 k)$ parity bits (which is a specific example of the second parity bits) from the (i−1)-th FEC frame, and mapped to $n_{sym}$ complex symbols using the QAM encoder. The metric is then calculated for the complex symbol sequences (signs included), and the sequence with the highest score is selected. The shaped bits and payload sign bits (which is a specific example of the third bit sequence), and pilot bits $p_o$ (which is a specific example of the second parity bits) now go through a channel deinterleaver ($ITL^{-1}$ in FIG. 6), and are used to generate parity bits $p_i$ (which is a specific example of the third parity bits) to be interleaved and transmitted with the (i+1)-th frame for transmitting the bit sequence $b_2$ (which is a specific example of the bit sequence subsequent to the first bit sequence as describe above). For example, the third channel interleaving operation may be performed on the shaped bits, payload sign bits, and pilot bits. Here the combination of the shaped bits $x_1$ and parity bits $p_o$ shown in FIG. 6 is a specific example of the second to-be-transmitted bit sequence as described above.

Figure 7:
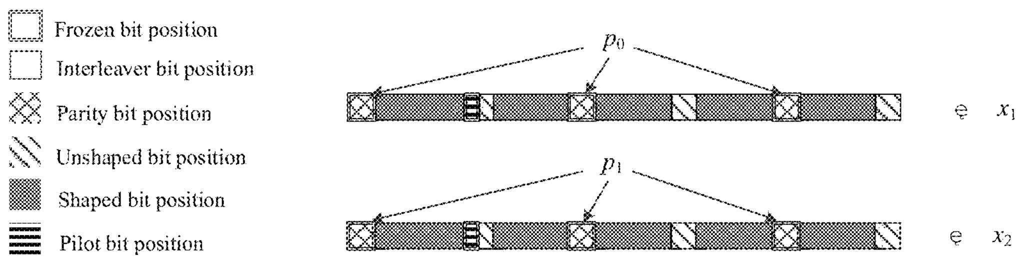
FIG. 7 shows a schematic diagram of a bit location assignment in the example shown in FIG. 10.

A receiving end may perform a constellation de-mapping which corresponds to the constellation mapping performed on the transmitting end (e.g., QAM demodulation) to obtain a bit sequence and parity bits for the next bit sequence. Besides, after checking the bit sequence with its parity bits obtained from the previously received bit sequence, the bit-level de-interleaving which corresponds to the bit-level interleaving before the sequence selection on the transmitting end will be done for the bit sequence, the receiving node may perform inverse distribution matching on the magnitude bits of the de-interleaved bit sequence, and obtain an original bit sequence by combining the output of the inverse distribution matching and the sign bits. As one possible implementation, the pilot bits and parity bits may have fixed bit locations in each of the k candidate bit sequences. The bit location assignment is illustrated in FIG. 7. The frozen bit positions hold the same bits in the same positions in all k candidate bit sequences. Hence both their positions and order can be determined prior to decoding the pilot bits. All the data required to decode the i-th frame is available once the (i+1)-th frame is received. For example, for bit sequence $x_1$, parity bits $p_o$ for the (i−1)-th frame and the pilot bits are frozen bits and occupy fixed positions, the unshaped bit positions are for payload sign bits of the bit sequence $b_1$, the shaped bit positions are for the shaped magnitude bits of the bit sequence $b_1$, so the payload sign bits and the shaped magnitude bits undergo bit-level interleaving, and then pilot bits and parity bits $p_o$ are added on fixed positions. It should be noted that the positions shown in FIG. 7 are illustrative rather than restrictive.

In the example, the selection metric is sign-dependent, which can improve the transmission strategy to reduce nonlinear distortion, and ensure the reliability of pilot bits through FEC protection. The DM and FEC encoder may be called only once while generating multiple candidate bit sequences. Moreover, the specific bit allocation and interleaver design can allow for efficient decoding with reasonable delay, making this solution well-suited for high-performance fiber-optic communication systems.

Figure 8:
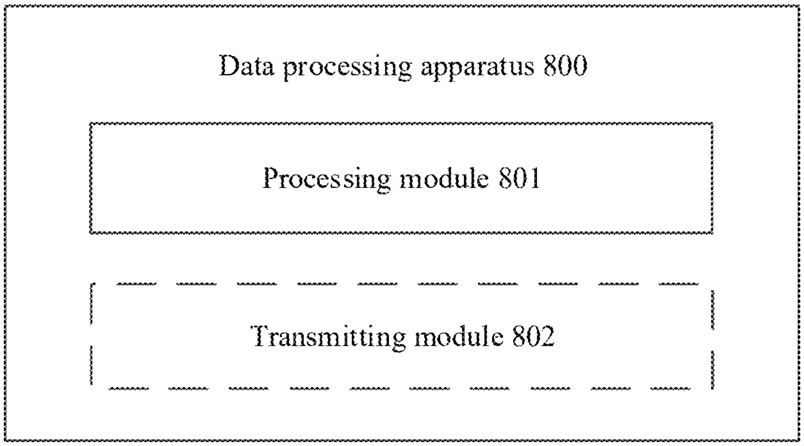
FIG. 8 shows a schematic structural diagram of a data processing apparatus according to one or more embodiments of the present disclosure.

FIG. 8 shows a schematic structural diagram of a data processing apparatus according to one or more embodiments of the present disclosure. As shown in FIG. 8, a first data processing apparatus 800 may include:

a processing module 801, configured to:

perform distribution matching on a first bit sequence to obtain a second bit sequence;

obtain at least two candidate bit sequences for the second bit sequence, wherein each of the at least two candidate bit sequences comprises a first bit part for identifying the candidate bit sequence and a second bit part obtained based on interleaving of the second bit sequence;

determine a third bit sequence in the at least two candidate bit sequences for channel coding.

In a possible implementation, the first bit sequence includes magnitude bits and sign bits corresponding to the magnitude bits;

where the distribution matching is performed on the magnitude bits of the first bit sequence.

In a possible implementation, the processing module 801 may configured to:

for each of the at least two candidate bit sequences, perform constellation mapping on the candidate bit sequence to obtain a first symbol sequence;

determine a bit sequence corresponding to a first symbol sequence in at least two first symbol sequences to be the third bit sequence.

In a possible implementation, the processing module 801 may configured to:

perform the channel coding on a combination of the third bit sequence and the sign bits of the first bit sequence to obtain first parity bits for the third bit sequence;

the data processing apparatus 800 further includes a transmitting module 802, configured to:

transmit a first to-be-transmitted bit sequence, where the first to-be-transmitted bit sequence includes the third bit sequence, the sign bits of the first bit sequence and the first parity bits for the third bit sequence.

In a possible implementation, the processing module 801 may configured to:

perform a first channel interleaving operation on multiple third bit sequences to obtain a first to-be-coded sequence;

code a combination of the first to-be-coded sequence and the sign bits of the first bit sequence by means of a preset channel coding scheme to obtain a first coded sequence;

perform a second channel interleaving operation on the first coded sequence to obtain the first parity bits, where the second channel interleaving operation is an inverse process of the first channel interleaving operation.

In a possible implementation, the second bit sequence includes magnitude bits of the first bit sequence after the distribution matching and the sign bits of the first bit sequence.

In a possible implementation, the processing module 801 may configured to:

for each of the at least two candidate bit sequences, perform constellation mapping on a combination of the candidate bit sequence and second parity bits to obtain a second symbol sequence, where the second parity bits are obtained from transmission of a bit sequence preceding the first bit sequence;

determine a bit sequence corresponding to a second symbol sequence in at least two second symbol sequences to be the third bit sequence.

In a possible implementation, positions of the second parity bits for combining with each of the at least two candidate bit sequences are predefined.

In a possible implementation, the data processing apparatus 800 further includes a transmitting module 802 which is configured to:

transmit a second to-be-transmitted bit sequence, where the second to-be-transmitted bit sequence includes the third bit sequence and the second parity bits, where positions of the second parity bits in the second to-be-transmitted bit sequence are predefined.

In a possible implementation, a position of a first bit part of the third bit sequence is predefined.

In a possible implementation, the processing module 801 is configured to:

perform the channel coding on the third bit sequence to obtain third parity bits for the third bit sequence, where the third parity bits for the third bit sequence are transmitted with a bit sequence subsequent to the first bit sequence.

In a possible implementation, the processing module 801 is configured to:

perform a third channel interleaving operation on multiple third bit sequences to obtain a second to-be-coded sequence;

code the second to-be-coded sequence by means of a preset channel coding scheme to obtain a second coded sequence;

perform a fourth channel interleaving operation on the second coded sequence to obtain the third parity bits, where the fourth channel interleaving operation is an inverse process of the third channel interleaving operation.

In a possible implementation, the data processing apparatus 800 further includes a transmitting module 802 which is configured to:

transmit a third to-be-transmitted bit sequence, where the third to-be-transmitted bit sequence includes the bit sequence subsequent to the first bit sequence and the third parity bits, where positions of the third parity bits in the third to-be-transmitted bit sequence are predefined.

In a possible implementation, the first sequence is a sequence to be shaped.

The first data processing apparatus may be applied to the transmitting node as described in the above method embodiments or may be the transmitting node as described in the above method embodiments. It should be understood by a person skilled in the art that, the relevant description of the above modules in the embodiments of the present disclosure may be understood with reference to the relevant description of the data processing method in the embodiments of the present disclosure.

Figure 9:
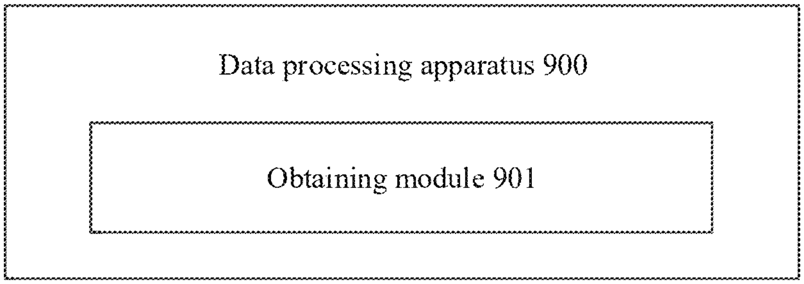
FIG. 9 shows a schematic structural diagram of another data processing apparatus according to one or more embodiments of the present disclosure.

FIG. 9 shows a schematic structural diagram of another data processing apparatus according to one or more embodiments of the present disclosure. As shown in FIG. 9, a second data processing apparatus 900 may include an obtaining module 901 configured to:

obtain a third bit sequence, where the third bit sequence is determined based on at least two candidate bit sequence for a second bit sequence, and each of the at least two candidate bit sequences includes a first bit part for identifying the candidate bit sequence and a second bit part obtained based on interleaving of the second bit sequence, where the second bit sequence is obtained based on distribution matching of a first bit sequence;

obtain the first bit sequence based on the third bit sequence.

In a possible implementation of the second aspect, the obtaining module 901 is configured to:

receive a second to-be-transmitted bit sequence, where the second to-be-transmitted bit sequence includes the third bit sequence and second parity bits, where the second parity bits are used for channel decoding of a bit sequence preceding the first bit sequence, and positions of the second parity bits in the second to-be-transmitted bit sequence are predefined;

receive a third to-be-transmitted bit sequence, where the third to-be-transmitted bit sequence includes the bit sequence subsequent to the first bit sequence and third parity bits, where the third parity bits are used for channel decoding of the third bit sequence, and positions of the third parity bits in the third to-be-transmitted bit sequence are predefined;

obtain the third bit sequence based on the second to-be-transmitted bit sequence and the third parity bits in the third to-be-transmitted bit sequence.

The second data processing apparatus may be applied to the receiving node as described in the above method embodiments or may be the receiving node as described in the above method embodiments. It should be understood by a person skilled in the art that, the relevant description of the above modules in the embodiments of the present disclosure may be understood with reference to the relevant description of the data processing method in the embodiments of the present disclosure.

Figure 10:
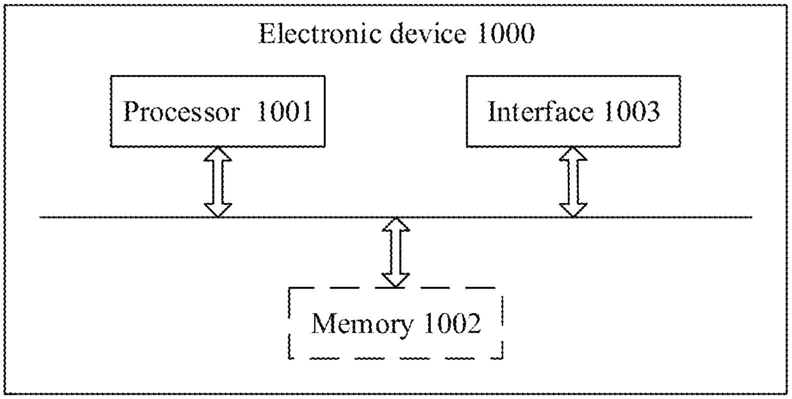
FIG. 10 shows a structural diagram of an electronic device according to one or more embodiments of the present disclosure.

FIG. 10 is a structural diagram of an electronic device according to one or more embodiments of the present disclosure. As shown in FIG. 10, the electronic device 1000 may include: a processor 1001 coupled to a memory 1002 in a communicative way via an interface 1003; where the memory 1002 stores a computer executable instruction; the processor 1001 executes the computer executable instruction stored in the memory 1002 for executing any of the above data processing methods related to the transmitting node. It should be noted that, the memory 1002 may be included or excluded from the electronic device, depending on actual needs.

Figure 11:
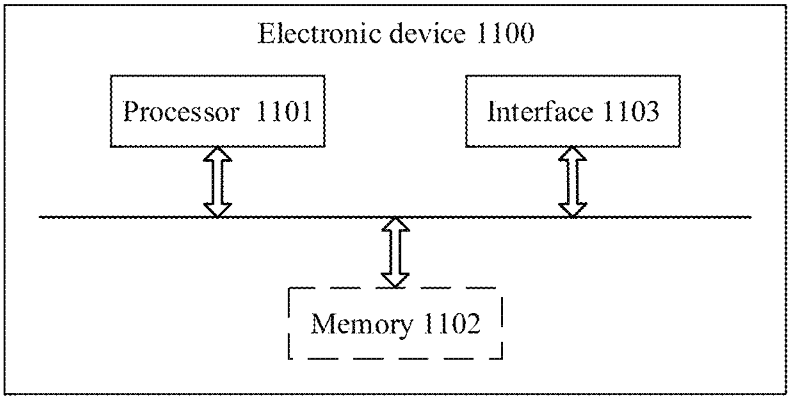
FIG. 11 shows a structural diagram of another electronic device according to one or more embodiments of the present disclosure.

FIG. 11 is a structural diagram of another electronic device according to one or more embodiments of the present disclosure. As shown in FIG. 11, the electronic device 1100 may include: a processor 1101 coupled to a memory 1102 in a communicative way via an interface 1103; where the memory 1102 stores a computer executable instruction; the processor 1101 executes the computer executable instruction stored in the memory 1102 for executing any of the above data processing methods related to the receiving node. It should be noted that, the memory 1102 may be included or excluded from the electronic device, depending on actual needs.

An embodiment of the present disclosure provides a transmitting node including processing circuitry for executing any of the above data processing methods. It should be understood that the transmitting node can execute the steps performed by the transmitting node in the above method embodiments, which will not be repeated here.

An embodiment of the present disclosure provides a receiving node including processing circuitry for executing any of the above data processing methods. It should be understood that the receiving node can execute the steps performed by the receiving node in the above method embodiments, which will not be repeated here.

An embodiment of the present disclosure provides an electronic device including an encoder for executing any of the above methods related to the transmitting node in the above method embodiments.

An embodiment of the present disclosure provides an electronic device including a decoder for executing any of the above methods related to the receiving node in the above method embodiments.

An embodiment of the present disclosure provides a wireless communication apparatus which includes a processor coupled to a memory. The memory is storing instructions that cause the processor to perform any of the above methods.

An embodiment of the present disclosure provides a wireless communication system, including a transmitting node and a receiving node. The transmitting node is configured to execute the steps in any of the above methods.

An embodiment of the present disclosure provides a computer-readable medium storing computer execution instructions which, when executed by a processor, causes the processor to execute any of the above methods.

An embodiment of the present disclosure provides a computer program product including computer execution instructions which, when executed by a processor, causes the processor to execute any of the above methods.

The embodiments may further be described using the following clauses:

1. A data processing method, including:

performing distribution matching on a first bit sequence to obtain a second bit sequence;

obtaining at least two candidate bit sequences for the second bit sequence, where each of the at least two candidate bit sequences includes a first bit part for identifying the candidate bit sequence and a second bit part obtained based on interleaving of the second bit sequence;

determining a third bit sequence in the at least two candidate bit sequences for channel coding.

2. The method according to clause 1, where the first bit sequence includes magnitude bits and sign bits corresponding to the magnitude bits;

where the distribution matching is performed on the magnitude bits of the first bit sequence.

3. The method according to clause 2, where the second bit sequence includes magnitude bits of the first bit sequence after the distribution matching.

4. The method according to clause 3, where the determining a third bit sequence in the at least two candidate bit sequences for channel coding includes:

for each of the at least two candidate bit sequences, performing constellation mapping on the candidate bit sequence to obtain a first symbol sequence;

determining a bit sequence corresponding to a first symbol sequence in at least two first symbol sequences to be the third bit sequence.

5. The method according to clause 3 or 4, further including:

performing the channel coding on a combination of the third bit sequence and the sign bits of the first bit sequence to obtain first parity bits for the third bit sequence;

transmitting a first to-be-transmitted bit sequence, where the first to-be-transmitted bit sequence includes the third bit sequence, the sign bits of the first bit sequence and the first parity bits for the third bit sequence; or, transmitting a first signal carrying a first to-be-transmitted bit sequence, where the first to-be-transmitted bit sequence includes the third bit sequence, the sign bits of the first bit sequence and the first parity bits for the third bit sequence.

6. The method according to clause 5, where performing the channel coding on the combination of the third bit sequence and the sign bits of the first bit sequence includes:

performing a first channel interleaving operation on multiple third bit sequences to obtain a first to-be-coded sequence;

coding a combination of the first to-be-coded sequence and the sign bits of the first bit sequence by means of a preset channel coding scheme to obtain a first coded sequence;

performing a second channel interleaving operation on the first coded sequence to obtain the first parity bits, where the second channel interleaving operation is an inverse process of the first channel interleaving operation.

7. The method according to clause 2, where the second bit sequence includes magnitude bits of the first bit sequence after the distribution matching and the sign bits of the first bit sequence.

8. The method according to clause 7, where the determining a third bit sequence in the at least two candidate bit sequences for channel coding includes:

for each of the at least two candidate bit sequences, performing constellation mapping on a combination of the candidate bit sequence and second parity bits to obtain a second symbol sequence, where the second parity bits are obtained from transmission of a bit sequence preceding the first bit sequence;

determining a bit sequence corresponding to a second symbol sequence in at least two second symbol sequences to be the third bit sequence.

9. The method according to clause 8, where positions of the second parity bits for combining with each of the at least two candidate bit sequences are predefined.

10. The method according to clause 8 or 9, further including:

transmitting a second to-be-transmitted bit sequence, where the second to-be-transmitted bit sequence includes the third bit sequence and the second parity bits, where positions of the second parity bits in the second to-be-transmitted bit sequence are predefined; or, transmitting a second signal carrying a second to-be-transmitted bit sequence, where the second to-be-transmitted bit sequence includes the third bit sequence and the second parity bits, where positions of the second parity bits in the second to-be-transmitted bit sequence are predefined.

11. The method according to clause 10, where a position of a first bit part of the third bit sequence is predefined.

12. The method according to any one of clauses 7 to 11, further including:

performing the channel coding on the third bit sequence to obtain third parity bits for the third bit sequence, where the third parity bits for the third bit sequence are transmitted with a bit sequence subsequent to the first bit sequence.

13. The method according to clause 12, where performing the channel coding on the third bit sequence includes:

performing a third channel interleaving operation on multiple third bit sequences to obtain a second to-be-coded sequence;

coding the second to-be-coded sequence by means of a preset channel coding scheme to obtain a second coded sequence;

performing a fourth channel interleaving operation on the second coded sequence to obtain the third parity bits, where the fourth channel interleaving operation is an inverse process of the third channel interleaving operation.

14. The method according to clause 12 or 13, further including:

transmitting a third to-be-transmitted bit sequence, where the third to-be-transmitted bit sequence includes the bit sequence subsequent to the first bit sequence and the third parity bits, where positions of the third parity bits in the third to-be-transmitted bit sequence are predefined; or, transmitting a third signal carrying a third to-be-transmitted bit sequence, where the third to-be-transmitted bit sequence includes the bit sequence subsequent to the first bit sequence and the third parity bits, where positions of the third parity bits in the third to-be-transmitted bit sequence are predefined.

15. The method according to any one of clauses 1 to 14, where the first bit sequence is a sequence to be shaped.

16. A data processing method, including:

obtaining a third bit sequence, where the third bit sequence is determined based on at least two candidate bit sequences for a second bit sequence, and each of the at least two candidate bit sequences includes a first bit part for identifying the candidate bit sequence and a second bit part obtained based on interleaving of the second bit sequence, where the second bit sequence is obtained based on distribution matching of a first bit sequence;

obtaining the first bit sequence based on the third bit sequence.

17. The method according to clause 16, where obtaining the third bit sequence includes:

receiving a second to-be-transmitted bit sequence, where the second to-be-transmitted bit sequence includes the third bit sequence and second parity bits, where the second parity bits are used for channel decoding of a bit sequence preceding the first bit sequence, and positions of the second parity bits in the second to-be-transmitted bit sequence are predefined;

receiving a third to-be-transmitted bit sequence, where the third to-be-transmitted bit sequence includes the bit sequence subsequent to the first bit sequence and third parity bits, where the third parity bits are used for channel decoding of the third bit sequence, and positions of the third parity bits in the third to-be-transmitted bit sequence are predefined;

obtaining the third bit sequence based on the second to-be-transmitted bit sequence and the third parity bits in the third to-be-transmitted bit sequence.

18. A first apparatus, including at least one processor coupled to a memory storing a set of instructions;

where the at least one processor is configured to read the set of instructions in the memory and execute the method according to any one of clauses 1 to 14.

19. A second apparatus, including at least one processor coupled to a memory storing a set of instructions;

where the at least one processor is configured to read the set of instructions in the memory and execute the method according to clause 15 or 16.

20. A non-transitory processor-readable storage medium, where the processor-readable storage medium has a computer program stored thereon, and the computer program is used to cause a processor to execute the method according to any one of clauses 1 to 14.

21. A non-transitory processor-readable storage medium, where the processor-readable storage medium has a computer program stored thereon, and the computer program is used to cause a processor to execute the method according to clause 15 or 16.

22. A computer program product, including computer program instructions, and computer program instructions enable a computer to execute the data processing method of any one of clauses 1 to 14 or clause 15 or 16.

23. A computer program, where the computer program enables a computer to execute the data processing method of any one of clauses 1 to 14 or clause 15 or 16.

The present disclosure encompasses various embodiments, including not only method embodiments, but also other embodiments such as apparatus embodiments and embodiments related to non-transitory computer readable storage media. Embodiments may incorporate, individually or in combinations, the features disclosed herein.

Although this disclosure refers to illustrative embodiments, this is not intended to be construed in a limiting sense. Various modifications and combinations of the illustrative embodiments, as well as other embodiments of the disclosure, will be apparent to persons skilled in the art upon reference to the description.

Features disclosed herein in the context of any particular embodiments may also or instead be implemented in other embodiments. Method embodiments, for example, may also or instead be implemented in apparatus, system, and/or computer program product embodiments. In addition, although embodiments are described primarily in the context of methods and apparatus, other implementations are also contemplated, as instructions stored on one or more non-transitory computer-readable media, for example. Such media could store programming or instructions to perform any of various methods consistent with the present disclosure.

Although the present disclosure describes methods and processes with steps in a certain order, one or more steps of the methods and processes may be omitted or altered as appropriate. One or more steps may take place in an order other than that in which they are described, as appropriate.

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may include a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

Although embodiments have been described above with reference to the accompanying drawings, those of skill in the art will appreciate that variations and modifications may be made without departing from the scope thereof as defined by the appended claims.

What is claimed is:

1. A data processing method, comprising:

performing distribution matching on a first bit sequence to obtain a second bit sequence, wherein the first bit sequence comprises magnitude bits and sign bits corresponding to the magnitude bits, wherein the distribution matching is performed on the magnitude bits of the first bit sequence, and wherein the second bit sequence comprises the magnitude bits of the first bit sequence after the distribution matching and the sign bits of the first bit sequence;

obtaining at least two candidate bit sequences for the second bit sequence, wherein each of the at least two candidate bit sequences comprises a first bit part for identifying a respective candidate bit sequence of the at least two candidate bit sequences and a second bit part obtained based on interleaving of the second bit sequence; and determining a third bit sequence in the at least two candidate bit sequences for channel coding.

2. The method according to claim 1, wherein the determining the third bit sequence in the at least two candidate bit sequences for channel coding comprises:

for each of the at least two candidate bit sequences, performing constellation mapping on the respective candidate bit sequence to obtain a respective first symbol sequence; and determining a bit sequence corresponding to a first symbol sequence in at least two first symbol sequences to be the third bit sequence.

3. The method according to claim 1, further comprising:

performing the channel coding on a combination of the third bit sequence and the sign bits of the first bit sequence to obtain first parity bits for the third bit sequence; and transmitting a first to-be-transmitted bit sequence, wherein the first to-be-transmitted bit sequence comprises the third bit sequence, the sign bits of the first bit sequence and the first parity bits for the third bit sequence.

4. The method according to claim 3, wherein the performing the channel coding on the combination of the third bit sequence and the sign bits of the first bit sequence comprises:

performing a first channel interleaving operation on multiple third bit sequences to obtain a first to-be-coded sequence;

coding a combination of the first to-be-coded sequence and the sign bits of the first bit sequence by using a preset channel coding scheme to obtain a first coded sequence; and performing a second channel interleaving operation on the first coded sequence to obtain the first parity bits, wherein the second channel interleaving operation is an inverse process of the first channel interleaving operation.

5. The method according to claim 1, wherein the determining the third bit sequence in the at least two candidate bit sequences for channel coding comprises:

for each of the at least two candidate bit sequences, performing constellation mapping on a combination of the respective candidate bit sequence and second parity bits to obtain a respective second symbol sequence, wherein the second parity bits are obtained from transmission of a bit sequence preceding the first bit sequence; and determining a bit sequence corresponding to a second symbol sequence in at least two second symbol sequences to be the third bit sequence.

6. The method according to claim 5, wherein positions of the second parity bits for combining with each of the at least two candidate bit sequences are predefined.

7. The method according to claim 5, further comprising:

transmitting a second to-be-transmitted bit sequence, wherein the second to-be-transmitted bit sequence comprises the third bit sequence and the second parity bits, wherein positions of the second parity bits in the second to-be-transmitted bit sequence are predefined.

8. The method according to claim 7, wherein a position of a first bit part of the third bit sequence is predefined.

9. The method according to claim 1, further comprising:

performing the channel coding on the third bit sequence to obtain third parity bits for the third bit sequence, wherein the third parity bits for the third bit sequence are transmitted with a bit sequence subsequent to the first bit sequence.

10. The method according to claim 9, wherein the performing the channel coding on the third bit sequence comprises:

performing a third channel interleaving operation on multiple third bit sequences to obtain a second to-be-coded sequence;

coding the second to-be-coded sequence by using a preset channel coding scheme to obtain a second coded sequence; and performing a fourth channel interleaving operation on the second coded sequence to obtain the third parity bits, wherein the fourth channel interleaving operation is an inverse process of the third channel interleaving operation.

11. The method according to claim 9, further comprising:

transmitting a third to-be-transmitted bit sequence, wherein the third to-be-transmitted bit sequence comprises the bit sequence subsequent to the first bit sequence and the third parity bits, wherein positions of the third parity bits in the third to-be-transmitted bit sequence are predefined.

12. The method according to claim 1, wherein the first bit sequence is a sequence to be shaped.

13. A data processing method, comprising:

receiving a second to-be-transmitted bit sequence, wherein the second to-be-transmitted bit sequence comprises a third bit sequence and second parity bits, wherein the second parity bits are used for channel decoding of a bit sequence preceding a first bit sequence, and positions of the second parity bits in the second to-be-transmitted bit sequence are predefined;

receiving a third to-be-transmitted bit sequence, wherein the third to-be-transmitted bit sequence comprises the bit sequence subsequent to the first bit sequence and third parity bits, wherein the third parity bits are used for channel decoding of the third bit sequence, and positions of the third parity bits in the third to-be-transmitted bit sequence are predefined;

obtaining the third bit sequence based on the second to-be-transmitted bit sequence and the third parity bits in the third to-be-transmitted bit sequence, wherein the third bit sequence is determined based on at least two candidate bit sequences for a second bit sequence, and each of the at least two candidate bit sequences comprises a first bit part for identifying a respective candidate bit sequence of the at least two candidate bit sequences and a second bit part obtained based on interleaving of the second bit sequence, wherein the second bit sequence is obtained based on distribution matching of the first bit sequence; and obtaining the first bit sequence based on the third bit sequence.

14. An apparatus, comprising at least one processor coupled to a memory storing a set of instructions;

wherein the at least one processor is configured to execute the set of instructions to cause the apparatus to:

perform distribution matching on a first bit sequence to obtain a second bit sequence, wherein the first bit sequence comprises magnitude bits and sign bits corresponding to the magnitude bits, wherein the distribution matching is performed on the magnitude bits of the first bit sequence, and wherein the second bit sequence comprises the magnitude bits of the first bit sequence after the distribution matching and the sign bits of the first bit sequence;

obtain at least two candidate bit sequences for the second bit sequence, wherein each of the at least two candidate bit sequences comprises a first bit part for identifying a respective candidate bit sequence of the at least two candidate bit sequences and a second bit part obtained based on interleaving of the second bit sequence; and determine a third bit sequence in the at least two candidate bit sequences for channel coding.

15. The apparatus according to claim 14, wherein determining the third bit sequence in the at least two candidate bit sequences for channel coding comprises:

for each of the at least two candidate bit sequences, performing constellation mapping on the respective candidate bit sequence to obtain a respective first symbol sequence; and determining a bit sequence corresponding to a first symbol sequence in at least two first symbol sequences to be the third bit sequence.

16. The apparatus according to claim 14, wherein the apparatus is further caused to:

perform the channel coding on a combination of the third bit sequence and the sign bits of the first bit sequence to obtain first parity bits for the third bit sequence; and transmit a first to-be-transmitted bit sequence, wherein the first to-be-transmitted bit sequence comprises the third bit sequence, the sign bits of the first bit sequence and the first parity bits for the third bit sequence.

17. The apparatus according to claim 16, wherein performing the channel coding on the combination of the third bit sequence and the sign bits of the first bit sequence comprises:

performing a first channel interleaving operation on multiple third bit sequences to obtain a first to-be-coded sequence;

coding a combination of the first to-be-coded sequence and the sign bits of the first bit sequence by using a preset channel coding scheme to obtain a first coded sequence; and performing a second channel interleaving operation on the first coded sequence to obtain the first parity bits, wherein the second channel interleaving operation is an inverse process of the first channel interleaving operation.

18. The apparatus according to claim 14, wherein determining the third bit sequence in the at least two candidate bit sequences for channel coding comprises:

for each of the at least two candidate bit sequences, performing constellation mapping on a combination of the respective candidate bit sequence and second parity bits to obtain a respective second symbol sequence, wherein the second parity bits are obtained from transmission of a bit sequence preceding the first bit sequence; and determining a bit sequence corresponding to a second symbol sequence in at least two second symbol sequences to be the third bit sequence.

19. An apparatus, comprising at least one processor coupled to a memory storing a set of instructions;

wherein the at least one processor is configured to execute the set of instructions to cause the apparatus to:

receive a second to-be-transmitted bit sequence, wherein the second to-be-transmitted bit sequence comprises a third bit sequence and second parity bits, wherein the second parity bits are used for channel decoding of a bit sequence preceding a first bit sequence, and positions of the second parity bits in the second to-be-transmitted bit sequence are predefined;

receive a third to-be-transmitted bit sequence, wherein the third to-be-transmitted bit sequence comprises the bit sequence subsequent to the first bit sequence and third parity bits, wherein the third parity bits are used for channel decoding of the third bit sequence, and positions of the third parity bits in the third to-be-transmitted bit sequence are predefined;

obtain the third bit sequence based on the second to-be-transmitted bit sequence and the third parity bits in the third to-be-transmitted bit sequence, wherein the third bit sequence is determined based on at least two candidate bit sequences for a second bit sequence, and each of the at least two candidate bit sequences comprises a first bit part for identifying a respective candidate bit sequence of the at least two candidate bit sequences and a second bit part obtained based on interleaving of the second bit sequence, wherein the second bit sequence is obtained based on distribution matching of the first bit sequence; and obtain the first bit sequence based on the third bit sequence.

20. A non-transitory processor-readable storage medium, wherein the non-transitory processor-readable storage medium has a computer program stored thereon, and the computer program is used to cause an apparatus to:

perform distribution matching on a first bit sequence to obtain a second bit sequence, wherein the first bit sequence comprises magnitude bits and sign bits corresponding to the magnitude bits, wherein the distribution matching is performed on the magnitude bits of the first bit sequence, and wherein the second bit sequence comprises the magnitude bits of the first bit sequence after the distribution matching and the sign bits of the first bit sequence;

obtain at least two candidate bit sequences for the second bit sequence, wherein each of the at least two candidate bit sequences comprises a first bit part for identifying a respective candidate bit sequence of the at least two candidate bit sequences and a second bit part obtained based on interleaving of the second bit sequence; and determine a third bit sequence in the at least two candidate bit sequences for channel coding.

* * * * *